United States Patent [19]

Gutenson et al.

[11] Patent Number: 5,043,531
[45] Date of Patent: Aug. 27, 1991

[54] WIRING LAYOUT FOR USE IN CONSTRUCTING NEW HOMES

[75] Inventors: Charles E. Gutenson, Annapolis, Md.; Lincoln R. Roberts, Decatur; Vernon R. Miller, Atlanta, both of Ga.

[73] Assignees: Smart House Limited Partnership, Upper Marlboro, Md.; AMP Incorporated, Harrisburg, Pa.

[21] Appl. No.: 464,131

[22] Filed: Jan. 16, 1990

[51] Int. Cl.⁵ .................................. H02G 3/00
[52] U.S. Cl. .................................. 174/49; 174/115; 174/117 F; 307/147
[58] Field of Search .................. 174/48, 49, 72 R, 115, 174/117 F; 307/42, 147

[56] References Cited

U.S. PATENT DOCUMENTS

| 3,909,503 | 9/1975 | Bird | 174/48 |
| 3,909,503 | 7/1988 | Miller et al. | 434/138 |
| 4,800,696 | 1/1989 | Miller et al. | 174/48 X |

FOREIGN PATENT DOCUMENTS

| 0213616 | 3/1987 | European Pat. Off. | 174/117 F |
| 2566593 | 12/1985 | France | 174/49 |
| 53-128738 | 11/1978 | Japan | 174/49 |
| 597877 | 2/1948 | United Kingdom | 174/49 |
| 1355184 | 6/1974 | United Kingdom | 174/49 |

*Primary Examiner*—Laramie E. Askin
*Attorney, Agent, or Firm*—Cushman, Darby & Cushman

[57] ABSTRACT

A wiring layout for new home construction in which primarily two different cables distribute various electrical signals from a central location to different rooms in a home. The first cable, an AC power and internal communications cable, is a ribbon cable containing power conductors and digital data conductors. A predetermined number of lengths of this ribbon cable form that number of branches from the central location to different areas of the home. The second cable, the external communications cable, is a cable containing coaxial conductors and twisted wire pairs in one casing. This cable is run from the central location to a splitter. A redetermined number of lengths of the second cable a ⁻ then run from the splitter to selected locations in some or all the rooms. The resulting layout from this combination branch-star layout allows efficient transmission of signals through a home and enables reduced installation costs.

23 Claims, 5 Drawing Sheets

WIRING LAYOUT FOR USE IN CONSTRUCTING NEW HOMES

BACKGROUND OF THE INVENTION

1. The Field of the Art

The present invention relates to simplified wiring layout for use in constructing homes or buildings, but preferably homes.

2. Description of the related art

Figure 1:
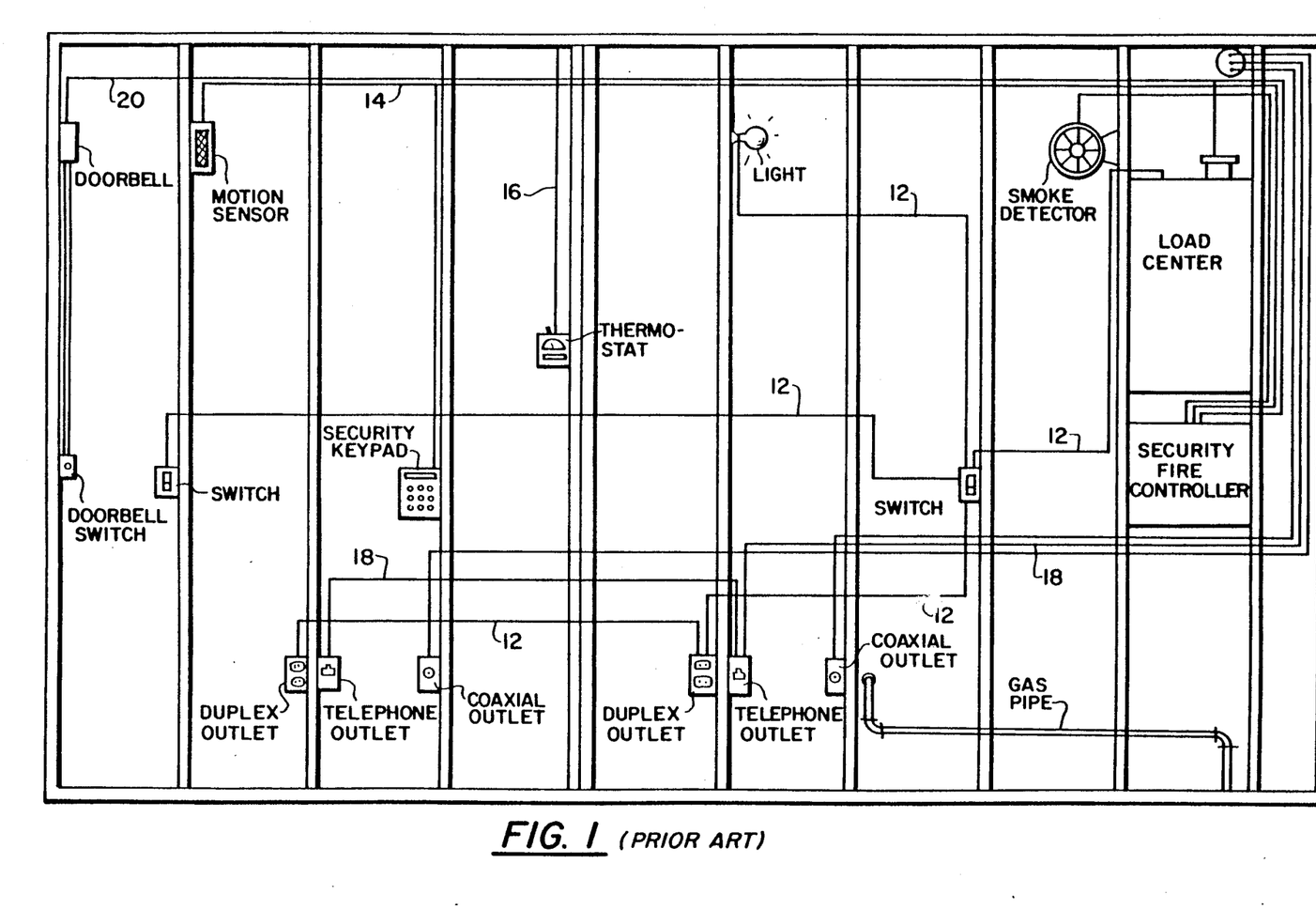
FIG. 1 is a side view of an open wall section of a conventional wiring layout.

Wiring used in conventional homes is haphazard and random. Separate wires are used for electrical power, telephone lines, security systems, intercoms, doorbells, and television reception, for example. FIG. 1 illustrates a wall section for a conventional home. Romex wire 12 for power, security cable 14, HVAC cable 16, telephone wire 18 and doorbell cable 20 all require separate installation. This results in high installation costs. Once plasterboard is placed over the wall section, it is difficult to know where the wires are located. As such, if electrical problems occur, it is very difficult to determine where the problem is.

A previous approach to solve this problem was proposed by the present assignee. A single ribbon cable was used for transferring electrical power, both AC and DC, digital data communications, telephone signals, television signals, and stereo signals. It was proposed to run this ribbon cable from a central location to the various rooms in a home. This cable, because it would be able to carry all necessary services, would then eliminate the need for separate installations of the various types of wiring in a home. An example of one cable proposed for this purpose is illustrated in U.S. Pat. No. 4,758,536.

Furthermore, at the central location, a microcomputer based control system would control all of the functional systems in a home. These functions included electrical switching, gas switching, security, heat regulation, and digital data communication between appliances possessing the ability to receive and transfer digital data. One key feature of this system is what has been termed "closed loop" electrical power, which is intended to connote that electrical power would not be delivered to an appliance or even an electrical outlet until certain conditions existed, and would only continue to supply power while these conditions continued. This made the AC power distribution much safer. Such a system is described in U.S. patent application Ser. No. 07/126,794, filed Dec. 1, 1987, now U.S. Pat. No. 4,899,217, and is expressly incorporated by reference.

Although it has been determined that a microcomputer based control system and a uniform wiring system is desirable, it has been determined that using a single ribbon cable to transfer all the signals from the central location to the various locations in a house was still labor intensive in the initial installation. The ribbon cable such as described in U.S. Pat. No. 4,758,536 was very bulky and unwieldy. Extra large holes in wall studs were required, and it was difficult to bend around corners and other places. Furthermore, noise problems existed that made the transmission of certain signals difficult. In view of these problems, a more efficient wiring layout was needed.

SUMMARY OF THE INVENTION

One object of the present invention is to provide a more efficient wiring layout to use when constructing new buildings, such as homes.

Another object of the present invention is to provide a wiring layout that can use a microcomputer based control system to control different functions in a home.

A further object of the present invention is to provide a wiring layout that provides decreased noise interference between AC power signals and other signals while still retaining the ability to provide the "closed loop" control of AC power at any location throughout the house.

The present invention meets the above objects by providing a wiring layout that uses three different types of cables to distribute various electrical signals from a central location to different rooms in a home. The first cable, the AC power and internal communications cable, is a ribbon cable containing power conductors and digital data conductors. A predetermined number of lengths of this ribbon cable form that number of branches from the central location to different areas of the home. The second cable, the external communications cable, is a cable containing coaxial conductors and twisted wire pairs in one casing. This cable is run from the central location to a splitter. A predetermined number of lengths of the second cable are then run from the splitter to selected locations in some or all the rooms. The third cable, a security or extension cable, is a ribbon cable having DC power and digital data conductors used for special applications, such as security, and as an all purpose extension cable for extension from the branch.

Using the AC power and internal communications cable and the external communications cable, which combine both branch and star layouts, the various electrical systems in a home can be controlled from a microcomputer based control system at a central location, yet be wired in a non-labor intensive manner that reduces noise between the various electrical systems.

BRIEF DESCRIPTION OF THE DRAWINGS

These and other advantages of the present invention may be appreciated from studying the following detailed description of the preferred embodiment together with the drawings in which.

DETAILED DESCRIPTION OF THE PREFERRED EMBODIMENT

Figure 2:
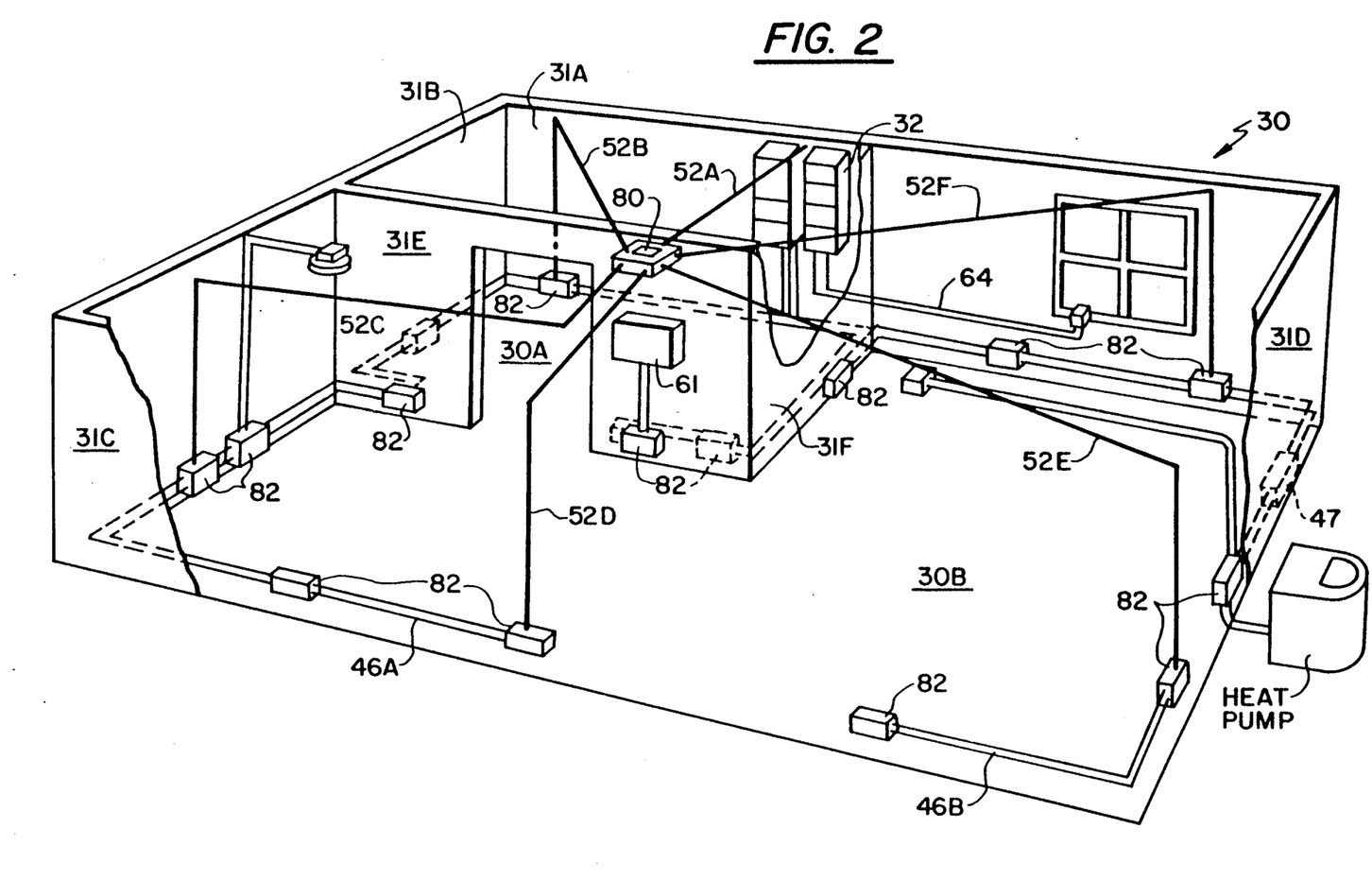
FIG. 2 is a cut away perspective view of a building containing the wiring topology according to the present invention.

FIG. 2 illustrates a home 30 wired using the layout of the present invention. Home 30 is shown simplified as having only 2 rooms 30A and 30B. It is recognized that a typical home will have more rooms.

In a central location, one that is preferably secure and isolated, is disposed a service center 32. Service center 32 receives external electrical signals and distributes these signals to the various locations in the home and is shown in block diagram form in FIG. 3. The inputs to service center 32 include AC power input 34. Telephone line input/output 36, and coaxial cable input/output 38, which can, for example, input signals from cable television services, roof antennas, or the like, complete the inputs and outputs external from the home.

Figure 4A:
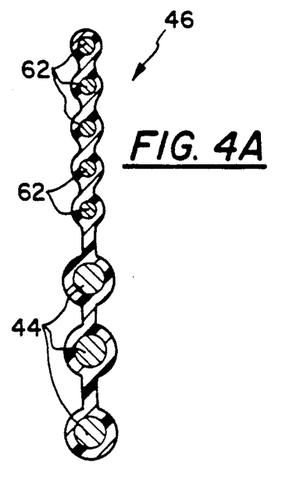
FIGS. 4A-4B are cross sections of an AC power and internal communications cable used in the wiring layout of the present invention.
Figure 4B:
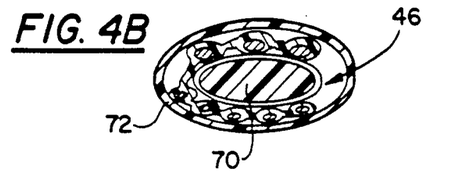

AC power, typically transmitted at 120 V in the United States, is input via AC input 34 to load center 40, which then delivers 120 V AC power to an AC/DC converter 42 and to the power conductors 44 located in a predetermined number of lengths or branches 46A and 46B of AC power and internal communications cable 46 (see FIGS. 4A and 4B). If 220 v AC power is needed, a separate point of attachment shown in FIG. 2 as outlet 47, which is not connected to the rest of the network, is necessary. FIG. 2 illustrates outlet 47 connected to a heat pump.

Telephone signals are input from and output to telephone input/output 36 and transmitted via telephone gateway 48 to the various telephone twisted pair conductors 50 located in external communications cable 52 as well as control and data communication system via an RS 232 cable 49. Each twisted pair is used as is commonly known in the art.

Similarly, signals from external coaxial cables are input from coaxial input 3 and transmitted to the downstream coaxial conductor 54 located in external communications cable 52 via coaxial gateway 56, which amplifies the signal to a level that will travel 200 feet along a coaxial cable. An upstream coaxial conductor 54 located in external communication cable 52 is used for conducting signals from inside the home to the coaxial gateway 56, from which location they can be distributed via the downstream coaxial conductor 54.

Control and data communication system 60, disposed within service center 32, is a microcomputer based control system that performs the various control functions within the house and performs data transfers between the various appliances within the house that are capable of sending, receiving, or sending and receiving digital data from the internal data communications bus. Control panel 61, illustrated in FIG. 2, provides a user interface to control and data communication system 60.

The internal data communications bus is physically implemented in the digital signal conductors 62 that are disposed in AC power and internal communications cable 46. Digital signal conductors 62 are also disposed in a security cable 64, which is a cable separate from both AC power and internal communications cable 46 and external communications cable 52. Also provided in security cable 64, which is preferably a ribbon cable, are DC conductors 66 that conduct low voltage DC power from AC/DC converter 42.

Before describing the wiring layout of the present invention in more detail, the preferred embodiment of security cable 64, AC power and internal communications cable 46, and external communications cable 52 will first be described with reference to FIGS. 4A, 4B, 5, and 6A-6D.

FIG. 4A illustrates that five conductors 62 and three conductors 44 are used in making AC power and internal communications cable 46. Conductors 62 are made of 24 gauge copper wire spaced at intervals of 0.1 inch. Conductors 44 are made of 12-14 gauge copper wire. The two conductors 44 nearest the end conductor 62 are spaced at intervals of 0.25 inch, while the outermost conductor 44 is spaced at 0.35 inch from the middle conductor 44. All of the conductors 44 and 62 are embedded in PVC plastic insulation, which is typical when making ribbon cable.

The five conductors 62 are preferably used as follows. The middle of the five conductors 62 is used as a reference ground wire. The pair of conductors 62 between the ground conductor and power conductors 44 is used to send a differentially driven clock signal from the control and data communications system 60 downstream cable 46. The other pair of conductors is used as a bidirectional communications of differentially driven control and data signals. A sixth conductor could also be included as a spare for more flexibility in possible later applications. The end power conductor 44 is the "hot" wire, the middle power conductor 44 is used as the neutral conductor, and the power conductor 44 adjacent to the end conductor 62 is used as the AC ground.

To minimize electrical noise between conductors 62 and 44, an insulation member 70, which is oval shape in cross section, is preferably used to wrap the ribbon cable formed from conductors 44 and 62 as shown in FIG. 4B. Furthermore, to make installation of cable 46 as easy as possible, the formed ribbon cable and insulation member 70 is disposed within an outer sheath 72.

Figure 5:
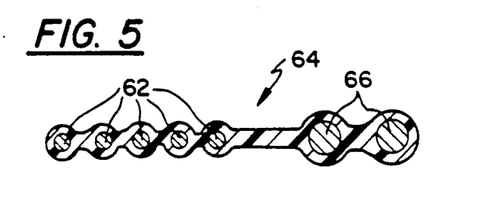
FIG. 5 is a cross section of a security cable and extension cable used in the wiring layout of the present invention.

FIG. 5 illustrates security cable 64 in greater detail. Conductors 62 are identical in construction to conductors 62 formed in AC power and internal communications cable 46. There are no conductors intended for AC power transmission, but conductors 66 for low voltage DC power transmission are disposed adjacent to conductors 62. Conductors 66 are preferably make of 18 gauge copper wire and spaced at intervals of 0.2 inch. Security cable 64 can also be used as an extension cable in locations where it is necessary to transfer digital data signals along conductors 62, but where it is unneeded or undesired to transmit AC power. One such location, for example, would be a light switch as implemented by the present invention, which will be discussed in more detail hereinafter.

Figure 6A:
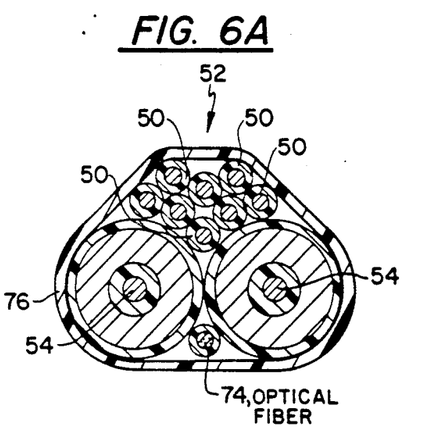
FIGS. 6A-6D are cross sections of different embodiments of an external communication cable used in the wiring layout of the present invention.
Figure 6B:
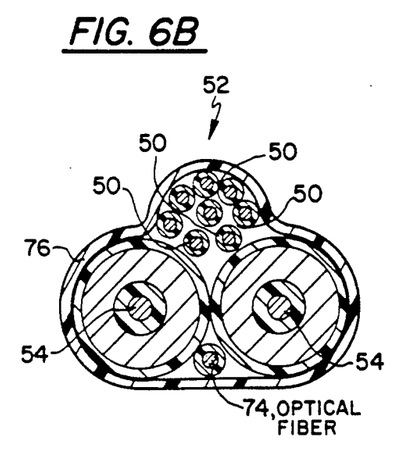
Figure 6C:
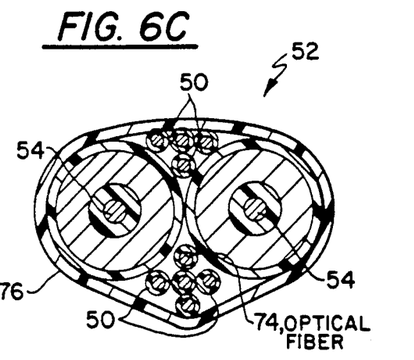
Figure 6D:
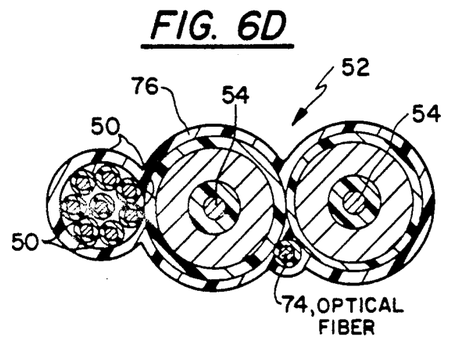

FIGS. 6A-6D illustrate four different embodiments of external communications cable 52. Each embodiment contains four twisted wire pairs 50, each wire preferably being 24 gauge copper wire. The two coaxial cables 54 are preferably standard RG-59. An optical fiber 74 is also optionally included. The presence of a prewired optical fiber 74 in the home will, most probably, be of significant value in the very near future as optical transmissions continue to increase. FIGS. 6A-6D also illustrate that twisted wire pairs 50, coaxial cables 54, and optical fiber 74 are all enclosed in an outer sheath 76. The various embodiments illustrate different ways in which the various conductors can be arranged within outer sheath 76. FIGS. 6A and 6C show loose twisted wire pairs 50, with all pairs 50 on one side of both coaxial cables 54 or the number of pairs 50 split equally on different sides, respectively. FIGS. 6B and 6D show bundled twisted wire pairs 50, in which the bundle of wire pairs 50 is on one side of both coaxial cables 54 or on the side of only one coaxial cable 54 in an extruded arrangement, respectively.

The wiring layout using security cable 64, AC power and internal communications cable 46, and external communications cable 52 will now be described with reference to FIGS. 2 and 7.

Figure 3:
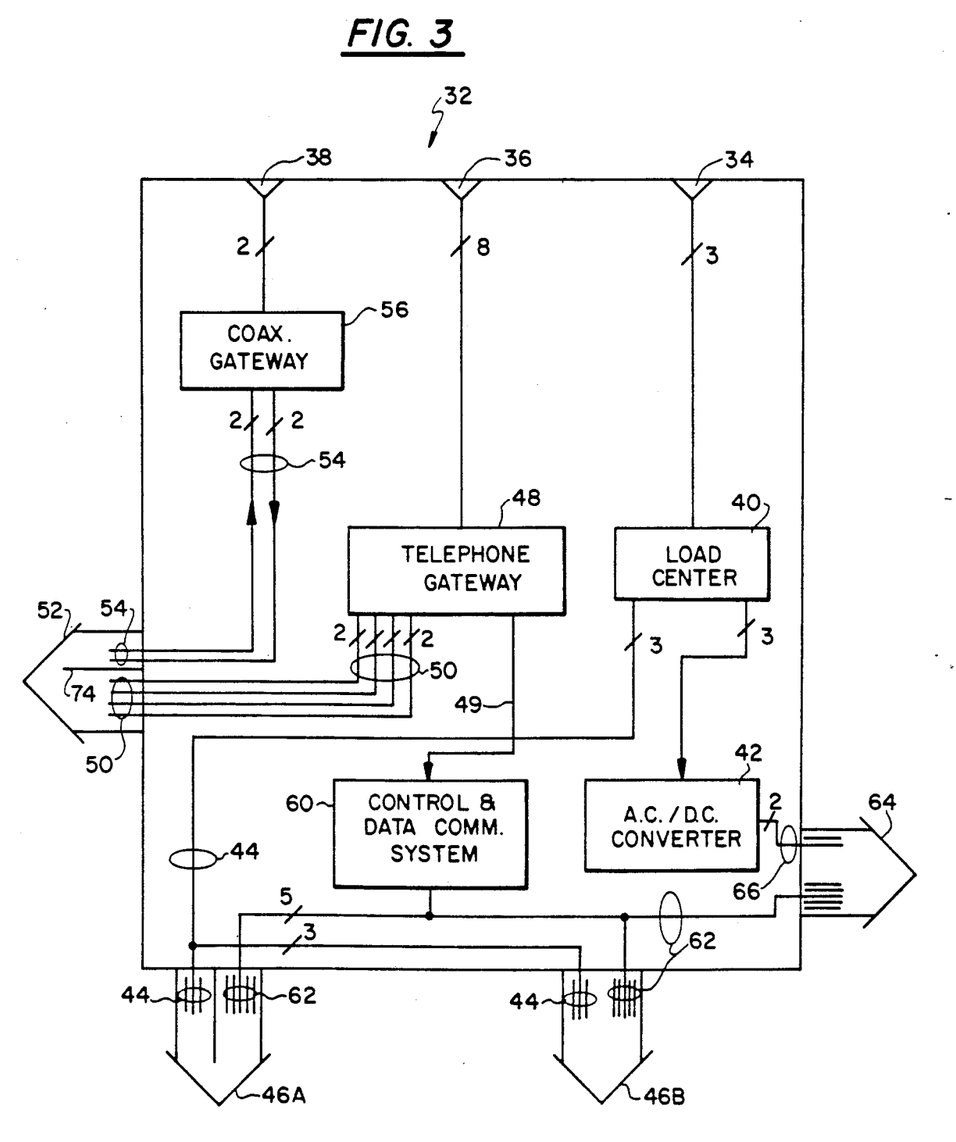
FIG. 3 is a block diagram of a service center according to the present invention.

The simplified home 30 illustrated in FIG. 2 has two branches of AC power and internal communications cable 46 illustrated, which corresponds to the two branches 46A and 46B of cable 46 illustrated in FIG. 3. Each of these branches has one end attached at service center 32. The cable is then run from the service center 32, primarily toward the lower portion of each wall, until that branch terminates. Each cable 46 used preferably has a length less than 400 feet, although lengths of only about 200 feet will normally be used. This ensures that undesirable degradation of AC power will not occur.

In FIG. 2, branch 46A runs from the service center 32, along the perimeter wall 31A, perimeter wall 31B, along a portion of interior wall 31E in both rooms 30A and 30B, further along perimeter wall 31B, and terminates along perimeter wall 31C. Branch 46B runs from the service center 32, alongside interior wall 31F and a portion of interior wall 31E in both rooms 30A and 30B, alongside perimeter wall 31A, perimeter wall 31D, and terminates along a portion of perimeter wall 31D.

Although the number of branches using AC power and internal communications cable 46 is illustrated as two, typically the number will be more than two.

An example of various segments of external communications cable 52 are also shown in FIG. 2. From the service center, a segment 52A of cable 52 runs to a splitter 80. Splitter 80 connects the upstream and downstream coaxial cables from segment 52A to each of the segments that are distributed to various locations in the home. Segments 52B-52F are illustrated. Splitter 80 also connects each of the twisted pairs 50 and the optical fiber 74 in segment 52A to the same twisted pairs 50 and optical fiber 74 in segments 52B-52F. It should be noted that the number of segments of external communications cable 52 shown in FIG. 2 is illustrative only.

The total length of cable segments 52 is estimated to be 200 feet. For this reason, the signals in downstream coaxial cables 54 are amplified in coaxial gateway 56. For total lengths less than 100 feet, it may be necessary to reduce the signal strength for that length. This signal reduction is preferably performed by an attenuator in splitter 80.

Also shown in FIG. 2 is security cable 64 that attaches directly to service center 32. Cable 64 is used for applications that require DC power even in the event of a power failure and also data communications using digital data conductors 62 in the event of a power failure. A backup DC power supply, not illustrated, can supply DC power to DC conductors 66. Digital data conductors 62 also provide continuous communication with control and data communication system 60 in the event of a power failure, as long as system 60 also is provided with backup power.

FIG. 2 further illustrates that AC power and internal communications cable 46 and external communications cable 52 both have locations where they have a common input/output. These locations are indicated as integrated outlets 82 in both FIGS. 2 and 7. It is at these integrated outlets 82 that all functional features can be used to their fullest by the owner of a home.

Integrated outlets 82 provide a modular integrated structure that allows access to all of the electrical functions of the home. If not all functions are required, the modularity of the integrated outlet 82 requires only the modular functions needed to be used, thereby being more cost effective. Integrated outlets 82 are further described in U.S. patent application Ser. No. 464,130 entitled "Improved Integrated Outlet for Communications and Closed Loop Electrical Power" filed on the same day as this patent application. Application Ser. No. 464,130 is a continuation-in-part of application Ser. No. 299,192 filed Jan. 19, 1989 and is expressly incorporated by reference into this patent application.

The various modules referenced in the "Improved Integrated Outlet for Communications and Closed Loop Electrical Power" application Ser. No. 464,130 include a duplex power and communication module, a lighting power module, a switch/sensor module, an uninterruptable power supply module, a telephone tap module, and a coaxial tap module. Different combinations of each of these modules can be used in any integrated outlet 82.

The duplex power and communication module, lighting power module, and switch/sensor module each requires a transfer circuit interface within the module having a recognizable address for each device attached. The interface then cooperates with control and data communication system 60 and the attached device in the transfer of digital data between attached devices or appliances and the control and data communication system 60. U.S. Pat. No. 4,899,217, previously incorporated by reference, discusses this interface using the term "power block". Control and data communication system 60 then polls each address so that command signals and data communications can be properly received and transmitted.

Figure 7:
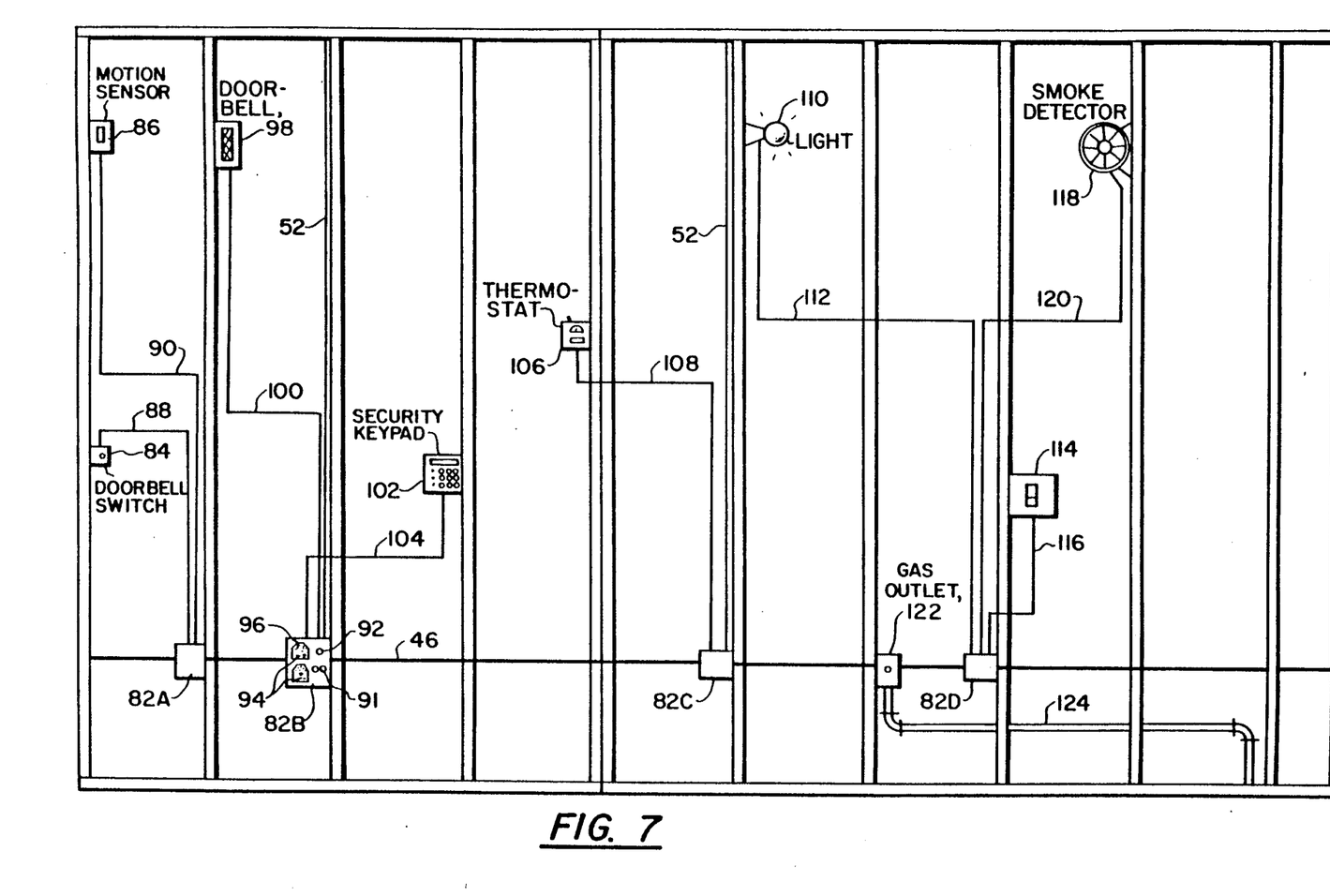
FIG. 7 is a side view of an open wall section using the wiring layout of the present invention.

The modularity of integrated outlets 82 is illustrated by the variety of combinations shown in FIG. 7.

Integrated outlet 82A requires a switch/sensor module to receive data signals from the two attached devices, doorbell switch 84 and motion sensor 86, via extension cables 88 and 90, respectively.

Integrated outlet 82B requires a coaxial tap module 91 and telephone tap module 92 connected to the conductors within cable 52, a duplex power and communication module for providing closed loop power to devices attached via each of the two AC power outlets 94 and for transmitting data to and receiving data from an attached appliance via digital data receptacles 96, and a switch/sensor module for transmitting a ring data signal to doorbell 98 via extension cable 100 and for transmitting data to and receiving data from security keypad 102 via extension cable 104. If security keypad required DC power, an AC to DC converter module would also be necessary to provide DC power to extension cable 104.

Integrated outlet 82C operates identically to integrated outlet 82B, but the switch/sensor module only has one attached device, the thermostat 106 via extension cable 108.

Integrated outlet 82D requires a lighting power module to operate light 110, which is connected to the lighting power module via cable 112. A switch/sensor module then connects switch 114, via cable 116, to digital data conductors 62 as well as smoke detector 118 via extension cable 120.

The modularity of the integrated outlet therefore cooperates with the layout of the present invention to result in an electrical distribution system that allows many different functions to be included in a new home at a very efficient cost.

Also illustrated in FIG. 7 is gas outlet 122, which is connected electrically to digital signal conductors 62 and inputs gas from gas piping 124. This gas outlet is also turned on using the control system 60, the manner of which is more fully described in U.S. Patent Application Ser. No. 07/363,849 entitled "Gas Distribution System", which is also expressly incorporated by reference.

While the invention has been described in connection with what is presently considered to be the most practical and preferred embodiments, it is understood that the invention is not limited to the disclosed embodiment, but, on the contrary, is intended to cover various modifications and equivalent arrangement included within the spirit and scope of the appended claims.

We claim:

1. A layout for wiring a building that allows internal digital data communication, AC power distribution, telecommunication distribution, and signal distribution comprising:
   a plurality of first cables running from a central location in said building to different locations in said building, each of said plurality of first cables comprising a ribbon cable including:
      a plurality of first conductors for distributing said internal digital data communications, and
      a plurality of second conductors for distributing said AC power; and
   a plurality of second cables arranged in a star configuration separate from said plurality of first cables for distributing said telecommunications and said signals, each of said plurality of second cables comprising:
      at least one coaxial cable for said signal distribution,
      a plurality of twisted pair conductors for said telecommunications distribution, and
      an outer sheath disposed around said at least one coaxial cable and said plurality of twisted pair conductors.

2. A layout according to claim 1 wherein each of said plurality of first cables is less than 400 feet long.

3. A layout for wiring a building that allows internal digital data communication, AC power distribution, and telecommunication signal distribution comprising:
   a plurality of first cables running from a central location in said building to different locations in said building, each of said plurality of first cables formed of a ribbon cable comprising:
      a plurality of first conductors for distributing said internal digital data communications, and
      a plurality of second conductors for distributing said AC power; and
   a plurality of second cables arranged in a star configuration separate from said plurality of first cables for distributing said telecommunications signals, each of said plurality of second cables comprising a plurality of conductors for transmitting said telecommunications signals.

4. A layout according to claim 3 wherein said conductors of each of said plurality of second cables are twisted wire pairs.

5. A layout according to claim 3 wherein each of said plurality of second cables further comprises a coaxial cable and an outer sheath disposed around said coaxial cable and said plurality of telecommunications conductors.

6. A layout according to claim 3 wherein each of said plurality of first cables is less than 400 feet long.

7. A layout for wiring a building that allows internal digital data communication, AC power distribution, and telecommunication signal distribution comprising:
   data and power distribution means for distributing internal digital data communications and AC power, said data and power distribution means comprising a first plurality of cables running from a central location in said building to different locations in said building, each of said plurality of first cables comprising:
      a plurality of first conductors for distributing said internal digital data communications, and
      a plurality of second conductors for distributing said AC power; and
   telecommunications distributing means for distributing said telecommunications signals, said telecommunications distributing means comprising a plurality of second cables arranged separate from and in substantially a different path from said plurality of first cables to minimize electrical noise between said first and second cables.

8. A layout according to claim 7 wherein each of said plurality of first cables is a ribbon cable.

9. A layout according to claim 8 wherein said plurality of second cables are arranged in a star configuration.

10. A layout according to claim 7 wherein said plurality of second cables are arranged in a star configuration.

11. A layout according to claim 7 wherein said plurality of second cables each comprises a plurality of twisted wire pairs for transmitting said telecommunications signals.

12. A layout according to claim 11 wherein said plurality of second cables each further comprises an optical fiber.

13. A layout according to claim 7 wherein said plurality of second cables each comprises an optical fiber for transmitting said telecommunications signals.

14. A layout according to claim 7 wherein said plurality of second cables each comprises a coaxial cable and an outer sheath.

15. A layout according to claim 7 further comprising receptacle means for connectable attachment of first peripheral devices inputting AC power and digital data communications and second peripheral devices inputting said telecommunications signals, said receptacle means comprising:
   first outlet means for connectable attachment of said first peripheral devices, said first outlet means connected to one of said first plurality of cables, and
   second outlet means for connectable attachment of said second peripheral devices, said second outlet means connected to one of said second plurality of cables.

16. A layout for wiring a building that allows internal digital data communication and AC power distribution to first peripheral devices and telecommunication signal distribution to second peripheral devices comprising:
   data and power distribution means for distributing internal digital data communications and AC power, said data and power distribution means comprising a first plurality of cables running from a central location in said building to different locations in said building, each of said plurality of first cables comprising:

a plurality of first conductors for distributing said internal digital data communications, and a plurality of second conductors for distributing said AC power;

telecommunications distributing means for distributing said telecommunications signals, said telecommunications distributing means comprising a plurality of second cables arranged separate from and in substantially a different path from said plurality of first cables to minimize electrical noise between said first and second cables; and receptacle means for connectable attachment of said first and second peripheral devices, said receptacle means comprising:

first outlet means for connectable attachment of said first peripheral devices, said first outlet means connected to one of said first plurality of cables, and second outlet means for connectable attachment of said second peripheral devices, said second outlet means connected to one of said second plurality of cables.

17. A layout according to claim 16 wherein each of said plurality of first cables is a ribbon cable.

18. A layout according to claim 17 wherein said plurality of second cables are arranged in a star configuration.

19. A layout according to claim 16 wherein said plurality of second cables are arranged in a star configuration.

20. A layout according to claim 16 wherein said plurality of second cables each comprises a plurality of twisted wire pairs for transmitting said telecommunications signals.

21. A layout according to claim 20 wherein said plurality of second cables each further comprises an optical fiber.

22. A layout according to claim 16 wherein said plurality of second cables each comprises an optical fiber for transmitting said telecommunications signals.

23. A layout according to claim 16 wherein said plurality of second cables each comprises a coaxial cable and an outer sheath.

* * * * *